June 14, 1966 V. D. CONDRAY 3,256,034
CONVERTIBLE TOP FOR BICYCLE
Filed Oct. 6, 1964
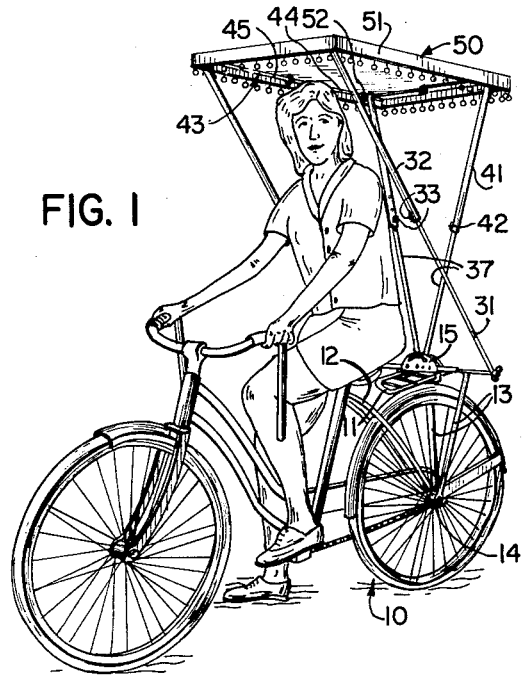
FIG. 1
FIG. 2
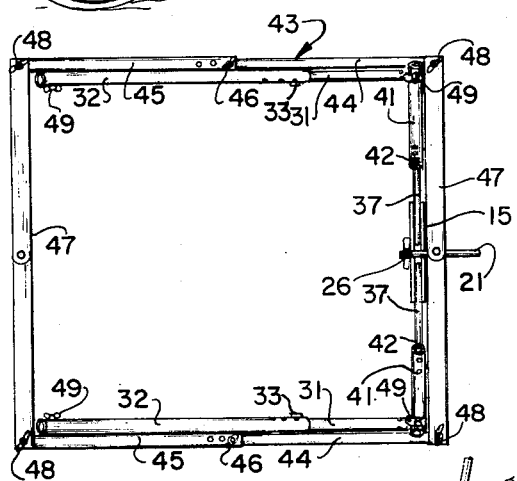
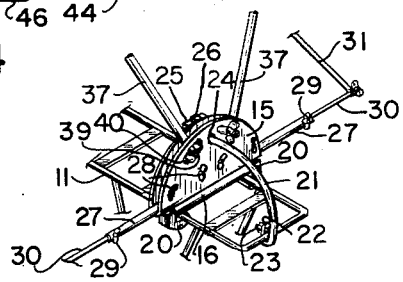
FIG. 4
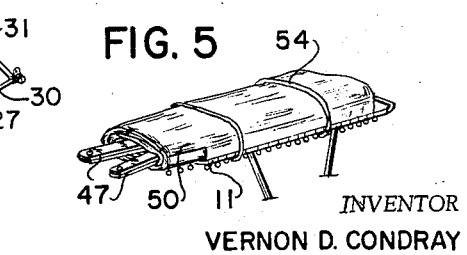
FIG. 5
FIG. 3
INVENTOR
VERNON D. CONDRAY
BY
*A. Yates Dowell Jr.*
ATTORNEYS United States Patent Office 3,256,034
Patented June 14, 1966

3,256,034
CONVERTIBLE TOP FOR BICYCLE
Vernon D. Condray, 853 Iris Drive,
North Fort Myers, Fla.
Filed Oct. 6, 1964, Ser. No. 401,794
9 Claims. (Cl. 296—102)

This invention relates to shelters of various kinds for protecting from the elements including canopies or tops employed with vehicles, some of which can be taken down when they are not in use.

The invention relates particularly to a convertible top for a bicycle which can be used to protect the elements such as the sun and rain and which can be taken down and carried in a small package attached to the vehicle at the will of the user.

The use of bicycles has not been with the comfort and satisfaction that could be obtained if there were some way to protect the rider from the elements, and, accordingly, it is an object of the invention to provide a simple, inexpensive convertible or konck-down canopy or top for a bicycle which can be readily installed and removed as well as adjusted to different positions to suit the needs and for the comfort and convenience of the user.

Another object of the invention is to provide a convertible top of knock-down construction capable of being mounted on a luggage carrier or rack of a bicycle and when knocked down incorporated in a package approximately the size of the luggage carrier or rack with means whereby it may be readily fastened thereto in its installed as well as in its used condition.

Other objects and advantages of the invention will be apparent from the following description taken in conjunction with the accompanying drawing wherein:

FIG. 1 is a perspective illustrating one application of the invention;

FIG. 2, a view of the parts in associated and separate relation;

FIG. 3, a fragmentary detail of the mounting device;

FIG. 4, a top plan view of the top frame with the canopy or covering removed; and FIG. 5, a perspective of the collapsed package in which the cover forms the enclosure for the remaining parts of the device.

Briefly stated, the invention is a convertible top including a generally rectangular top frame with a cover therefor and four supports for attachment to the corners of the frame, each of the supports being adjustable lengthwise and with a mounting device with means for clamping the same to a luggage carrier or rack over the rear wheel of a bicycle, which device has side members to which the adjustable supports which extend to the front of the top are connected and a central portion to which the lengthwise adjustable supports connect with the rear of the top, the mounting device being pivoted for limited forward and rear movement and with the supports which carry the top mounted for lateral adjustment.

With continued reference to the drawing, the convertible top of the present invention is adapted to be mounted on a bicycle 10 having a luggage rack composed of a generally rectangular frame 11 of rod stock. The front of the luggage rack is attached by a connection 12 to the frame of the bicycle, while the rear portion of the luggage rack is connected by side supports 13 to the rear axle 14.

The convertible top including mounting structure therefor is of knock-down construction capable of being incorporated in a package approximately the size of the luggage rack so that it can be readily fastened thereto when not in use.

The convertible top comprises a mounting base or the like 15 including an attached tube or bracket 16 through which extends a bolt 17 having a head 18 at one end and a wing nut 19 at its opposite end by means of which bolt and wing nut a pair of attaching hooks 20 may be secured in firm engagement with the rack 11.

Means is provided for securing the base in a generally vertically adjusted position including a curved stabilizing rod 21 having a flattened end portion 22 bent reversely upon itself and provided with a clamping nut and bolt 23. This bolt 23 can be removed to apply the end of the rod 21 on the end piece of the rack 11 and thereafter the bolt clamped in place to provide a solid connection with the rack. The opposite end of the curved rod 21 extends through a pair of openings 24 and is secured by means of an intermediate block 25 which faces the upper edges of the base part with a set screw 26 in said block engaging the rod in fixed position.

The base forms a mounting means for the demountable top and in order to mount the top on the base, a transverse rod 27 is located in the lower U-shaped portion of the base and is fastened in place by means of bolts and wing nuts 28. The outer ends of the rod 27 are provided with thumb screws 29 for adjustably fastening telescopic members 30 within the ends of the same. These telescopic members form supports for generally parallel and obliquely upwardly extending support arms 31 which extend into telescoping tubes 32 and are fixed in a lengthwise adjusted position by means of set screws 33. The rods 31 are connected with rods 30 by means of wing bolts 34 which extend through openings 35 into the internally threaded bores 36 of the members 30. Members 29, 30 thus provide for lateral adjustment of telescopic canopy support members 31, 32 to secure adequate shoulder clearance for the bicyclist. In addition to the adjustable telescopic support members 31 and 32 at each side of the vehicle, a pair of rods 37 are provided having their lower ends extending divergently upwardly from and between the spaced front and rear portions of the base 15 and are mounted by means of wing bolts 39 located through the rods 37 and movable in opposed slots 40. Thus the rods 37 can be swung from side to side in the base 15. Over the rods 37 are telescoped tubes 41 secured in place by set screws 42. Thus the pairs of adjustable length members formed by the rods 31 and 37 and tubes 32 and 41 provide a suspension system for a top frame 43 composed of a pair of rods 44 and tubes 45 in telescoping relation secured in adjusted position by means of thumb screws 46 and with a pair of hinged front and rear members or links 47 so that the hinged members or links can be folded together while the side members are telescoped when the parts are in collapsed position to provide a relatively small package. The adjustable side members and hinged front and rear members are connected by means of wing bolts 48 at each conrner. The upright tube portions 32 and 41 are connected to the side members of the top frame by means of the bolts 48 being secured in the upper ends of tubes 32 and 41 by wing bolts 49. A canopy 50 with an overhanging edge 51 is fitted over the top frame 43 and can be attached thereto by means of concealed straps 52 secured by snap fasteners 53.

It will be apparent from the foregoing that a demountable top is provided which can be readily installed and removed and the top canopy utilized as a casing for the same, as illustrated by FIG. 5. The device then can be readily secured by cords or straps 54 to the luggage rack 11 of the bicycle. In assembling the demountable top, the base is first attached to the rack in transverse position as illustrated in FIG. 3; then the rods 30 are applied after which rods 31 with tubes 32 attached are telescoped and secured by the wing bolts 34; then the rods 37 with attached tubes 41 are secured to the base member by means of wing bolts 39 after which the top frame consisting of side members 44 and 45 and hinged members 47 is opened and telescoped to its extended position and secured by means of set screws 46. This completed, the entire top frame 43 may be secured to upright tubes 32 and 41 by means of wing bolts 49. The top is then secured in fixed position at the proper angle with relation to the base to dispose the top over the person riding the bicycle.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A convertible top for a bicycle comprising a canopy, a plurality of members forming a generally rectangular frame mounting said canopy, first and second pairs of adjustable elongated supports mounting said canopy frame, means forming detachable end connections between said canopy frame members, said means connecting said first and second pairs of adjustable supports to said canopy frame, a generally planar mounting device solely carrying said pairs of supports and having means thereon by which it is adapted to be attached generally vertically on a bicycle, said planar mounting device having end connection means extending generally horizontally therefrom adapted for disposition on opposite sides of the bicycle, said first pair of elongated supports being pivotally connected to the ends of said generally horizontally extending connection means of said planar mounting device and extending obliquely upwardly and generally parallel therefrom to said detachable connections on said canopy frame at one end thereof, said second pair of supports being mounted on said mounting device intermediate the length thereof and extending divergently upwardly therefrom and connected to the other end of said canopy frame in the vertical plane of said mounting device.

2. A convertible top for a bicycle comprising a canopy, a generally rectangular frame formed of a plurality of members mounting said canopy, first and second pairs of adjustable supports mounting said canopy frame, means forming pivotal connections between said members forming said canopy frame, said means connecting said first and second pairs of adjustable supports to said canopy frame, a generally planar mounting device solely carrying said supports and having means by which it may be attached in a vertical plane transversely of a bicycle, said planar mounting device having aligned horizontally extending connecting means adapted for disposition on opposite sides of the bicycle with said first pair of supports connected to and extending obliquely upwardly and substantially parallel from said planar mounting device to said connecting means, said other pair of supports being connected to the central portion of said planar mounting device and extending upwardly and divergently to the rear of said canopy frame, the connections between said planar mounting device and the first and second pair of supports and the canopy frame being adjustable to locate the canopy frame in a plurality of different positions.

3. An adjustable knock-down and stowable canopy particularly for mounting on a bicycle for affording protection to the rider thereof from elements of the weather comprising a planar base structure adapted for substantially vertical mounting on a portion of the bicycle rearwardly of and normal to the seat thereof for positioning symmetrically thereon in the plane of the bicycle frame, canopy frame means for support from said planar base structure, said canopy frame means comprising a pair of parallel telescopically adjustable side members and a pair of hinged members at each end thereof, means for pivotally connecting said canopy frame side members at each end thereof to said hinged members to form a foldable generally rectangular structure, a first pair of adjustably telescopic support members pivotally connected at the corners at one end of said canopy frame and depending in convergent relation to said planar base structure being releasably attached thereto, and a second pair of adjustable telescopic canopy support members pivotally connected to the corners at the other end of said canopy frame and depending in generally parallel relation to said planar base structure being releasably pivotally attached thereto, said planar base structure including aligned means for supporting and adjustably spacing the connections of said second adjustable telescopic members transversely of each other in the plane of said planar base structure.

4. An adjustable knock-down and stowable canopy as defined in claim 3 wherein said means connecting said telescopic canopy frame side members to said canopy frame hinged end members comprise means for connecting said first and second pairs of telescopic members to said canopy frame.

5. A portable and adjustable protective canopy structure adapted for use on a bicycle for protecting a rider thereof against the elements of the weather comprising a generally rectangular canopy frame having end members and telescoping side members of adjustable length with removable means pivotally connecting said end and side members together, each of said end members comprising a pair of hinged links whereby each end member is foldable on itself when said canopy structure is dismantled, a flexible canopy for covering said frame, an elongated base supporting device adapted for mounting in a generally vertical plane for the sole support of said canopy-covered frame, first and second pairs of adjustable length canopy and frame supports removably mounted on the ends and medial portions of said base supporting device and connected at one end thereof to said canopy frame at the corners thereof and to said planar base supporting device at their opposite ends, said pivotally connecting means for said rectangular frame releasably connecting said first and second pairs of adjustable length supports to said rectangular frame, said canopy structure being capable of being completely disassembled and wrapped in said flexible canopy to form a small compact unit easily transported on the luggage carrier of a bicycle.

6. convertible top for a bicycle comprising a canopy for disposition over the head of the rider of a bicycle, a collapsible rectangular frame for mounting said canopy thereon, a base mounting structure having adjustable outer end portions and adapted for solely supporting the canopy and frame at one end of a bicycle, adjustably extendable elongated support members extending between each corner of said rectangular frame of said canopy and said base structure, a pair of said extendable and elongated support members mounted on and extending divergently upwardly from the central portion of said base supporting structure and attached to one end of said rectangular canopy frame, and another pair of said extendable and elongated support members extending generally parallel to each other and obliquely upwardly from said adjustable outer end portions of said base supporting structure and attached to the other end of said rectangular frame to provide clearance for the rider under the canopy and for positional adjustment of said canopy frame.

7. A convertible top for a bicycle as defined in claim 6 wherein said base mounting structure comprises a plate-like member for mounting in a vertical plane, aligned extendably adjustable mounting means extending generally horizontally from each end of said base member, means for releasably securing said pair of divergently extending support members on said plate-like base supporting member, and means for removably securing said pair of generally parallel and obliquely upwardly extending extensible support members to the respective ends of said aligned horizontally extending and adjustable mounting means of said base member.

8. A convertible top for a bicycle as defined in claim 6 wherein said generally planar base mounting structure comprises a generally vertically extending U-shaped base member adapted for mounting on a bicycle rearwardly of the seat thereof so as to extend transversely of the plane of the frame of the bicycle, clamping means adapted for fixedly securing said U-shaped base member in vertically mounted position, means for releasably securing said pair of divergently upwardly extending support members on said U-shaped base member, said adjustable outer end portions of said base mounting structure comprising substantially horizontally extending tubular means secured within the bight of said U-shaped member.

9. A knock-down canopy structure for use on a bicycle to protect the bicyclist from elements of the weather comprising a collapsible canopy frame for receiving a canopy thereon, a base support structure for said canopy comprising a semi-circular and planar U-shaped device adapted for mounting on and symmetrically in a vertical plane at right angles to the plane of the frame of a bicycle, said U-shaped base support structure having a tubular member fixed in the bight thereof and extending substantially horizontally therein, an extension rod member adjustably secured in each end of said horizontal tubular member, a first pair of divergent and upwardly extending adjustable length support members secured to and mounted in the medial portion and in the plane of said base support structure, a second pair of generally parallel and obliquely upwardly extending adjustable length support members each adjustably secured to the outer end of each of said extension rod members, the upper ends of said first and second pairs of adjustable length support members being adjustably secured to the opposite end portions of said canopy frame, the adjustable end connections of the adjustable length support members enabling the canopy frame to be adjusted in a plurality of directions and the canopy structure to be adjusted to conform to the size of the bicyclist.

References Cited by the Examiner

UNITED STATES PATENTS

| | | | |
|---|---|---|---|
| 490,229 | 1/1893 | Hohenstein et al. | 135—7 |
| 726,610 | 4/1903 | Zech | 135—7 |
| 2,566,572 | 9/1951 | Lindsey | 296—102 X |
| 3,176,699 | 4/1965 | Rollins | 248—40 X |

FOREIGN PATENTS

| | | |
|---|---|---|
| 152,329 | 9/1937 | Austria. |
| 1,189,433 | 10/1959 | France. |
| 404,213 | 10/1924 | Germany. |
| 220,532 | 6/1924 | Great Britain. |
| 479,484 | 3/1953 | Italy. |

BENJAMIN HERSH, *Primary Examiner.*

C. C. PARSONS, *Assistant Examiner.*